(No Model.)

C. DIXON.
PITMAN BOX CONNECTION FOR MOWERS AND REAPERS.

No. 292,289. Patented Jan. 22, 1884.

WITNESSES:
C. Neveux
C. Sedgwick

INVENTOR:
C. Dixon
BY Munn & Co
ATTORNEYS.

UNITED STATES PATENT OFFICE.

CHARLES DIXON, OF WEEDSPORT, NEW YORK.

PITMAN-BOX CONNECTION FOR MOWERS AND REAPERS.

SPECIFICATION forming part of Letters Patent No. 292,289, dated January 22, 1884.

Application filed October 5, 1883. (No model.)

*To all whom it may concern:*

Be it known that I, CHARLES DIXON, of Weedsport, in the county of Cayuga and State of New York, have invented certain new and useful Improvements in Pitman-Box Connections for Mowers and Reapers, of which the following is a full, clear, and exact description.

This invention relates to pitman-box connections, such as are used for connecting the reciprocating cutters of reapers and mowers with their driving-cranks; and the invention consists in certain constructions and combinations of parts for securing a better working joint or fit of the socket portion of the box with the pin or ball which works therein, whenever either by irregularities in the sizes or shape of said parts, as produced by the casting of them or by the wear of them, the same are liable to shake or jar and form an imperfect connection.

It also consists in a certain construction of the strap or frame which carries the socket half-boxes, whereby the same is made to form an oil-receptacle for the lubrication of the pin or ball, substantially as hereinafter described.

Reference is to be had to the accompanying drawings, forming part of this specification, in which similar letters of reference indicate corresponding parts in all the figures.

Figure 1:
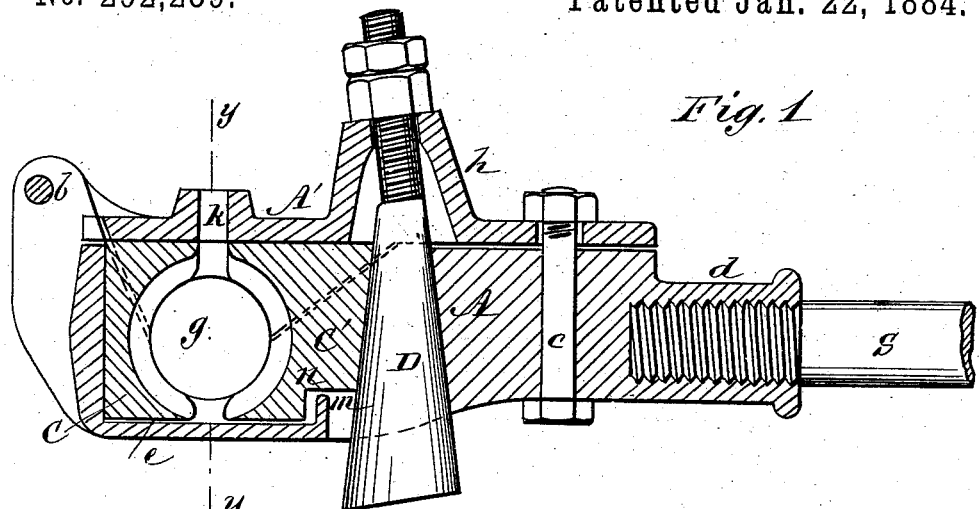
Figure 2:
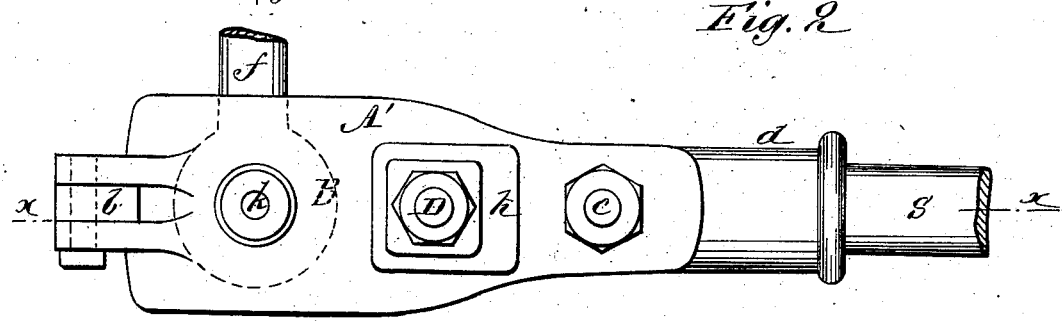
Figure 3:
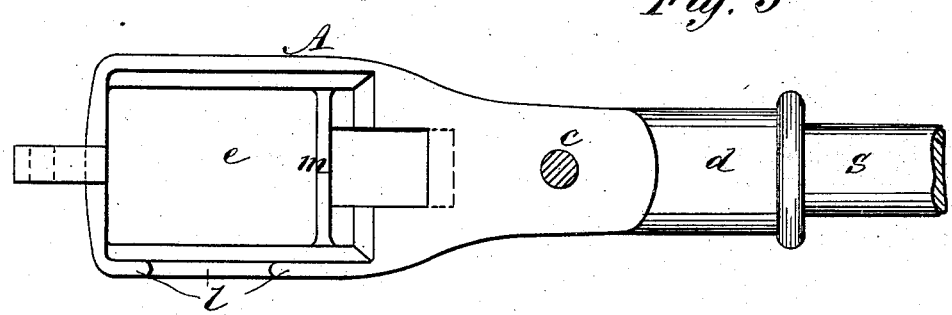
Figure 4:
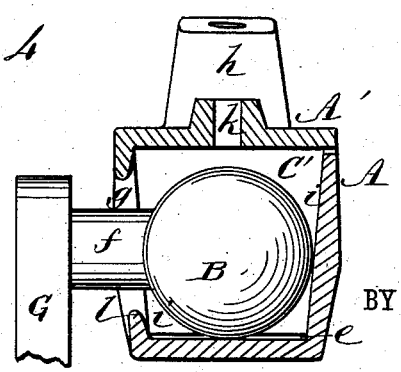

Figure 1 represents a vertical longitudinal section, on the line $x\,x$ in Fig. 1, of a ball-and-socket pitman-box connection embodying my invention, the ball portion of the device being omitted. Fig. 2 is a plan of the same with the ball in its place. Fig. 3 is a plan of the frame portion of the connection which carries the half-boxes, with its lid removed; and Fig. 4 is a vertical transverse section, on the line $y\,y$ in Fig. 1, of the connection with the ball in its place, but with a tightening key or wedge used in the device omitted.

A indicates the strap-frame or head part of a pitman-box connection for the cutter-bar of a reaping or mowing machine, the same being constructed, as usual, with a lid, A′, hinged at one end, as at $b$, and secured at its opposite end by a bolt, $c$, also made with the usual screw socket or neck, $d$, at its forward end, for attachment of the pitman S, which connects with the cutter-bar.

C C′ are the half-boxes within the chamber or recess $e$ in said strap or frame, of the usual concave shape on their faces, to form a bearing for the ball B, which connects by a neck, $f$, that passes out through an opening, $g$, in the one side of the frame, with the driving-crank G, as usual. The rear half-box, C, is, or may be, stationary; but the forward half-box, C′, is made adjustable toward or from the half-box C, to adapt the bearing to the ball, not only as wear may require, but as irregularities in shape and size of the ball or its half-boxes produced in casting may render necessary or desirable, to lessen or do away with jar and to reduce the liability to breakage. This may be done in part by a wedge or key, D, arranged to pass up through a keyway in the strap or frame A, back of the sliding half-box C′, and tightened up and secured by nuts on the top of a hollow swell, $h$, on the lid A′. In this way, or by this means, the half-boxes forming the socket may be adjusted to the ball; but in case of irregularities in the shape of the bearing parts—as, for instance, in a partly oval or imperfect configuration of the ball—then the half-box C′ should be held from playing backward and forward or following up such irregularities in shape, after it has once been set up or adjusted to its proper position by the key. To this end the half-box C′ is made inclining on its sides $i\,i$, or, in other words, of reduced width in a downward direction, and the sides of the chamber $e$ which it fits are made to correspond; and, furthermore, it is constructed so that it does not come fully down to the bottom of said chamber, and so that the lid A′, when closed and secured, will bear or wedge the half-box C′ down within the chamber $e$ of the frame A, thus holding said half-box, after it has been adjusted, from slipping away from the key D to follow up irregularities in the shape of the ball. Both half-boxes C C′ may be similarly constructed and be similarly held down to their places by the lid A′, as here described more particularly for the half-box C′.

Oil is or may be admitted to the bearing through an oil-hole, $k$, in the lid A′, and the frame A is constructed so that its box-chamber $e$, in proximity to the bottom of which the ball B works, forms a receptacle at its base for oil, within which the ball moves and lubricates itself. Thus the chamber $e$ of the frame A is inclosed at its base on all its sides, being formed with a raised lip, $l$, on the side which has the opening $g$ in it, and with a further raised lip, m, on its forward end, and the half-box C' is stepped, as at n, to fit over the same, for the purpose of preventing oil from running out of the base portion of the chamber e through the key hole or way in the frame.

Although the invention has here been shown and described as applied to a ball-and-socket connection, it is equally applicable to a pitman-box connection in which a straight round pin of enlarged dimensions where it works in the socket is used in the place of a ball, in which case the interior surfaces of the boxes would be made to conform to the cylindrical shape of the pin.

Having thus described my invention, I claim as new and desire to secure by Letters Patent—

1. In pitman-box connections, the combination, with the frame or head part A, having its chamber e constructed with interior tapering sides, the half-boxes C C' of which have sloping sides i i, and are constructed to stop short of the bottom of said chamber, the connection B, the adjusting or tightening-up key D, and the hinged lid A', provided with a tightening bolt or fastening, and arranged to bear down on the half box or boxes, to hold it or them in place, essentially as described.

2. In pitman-box connections, the combination, with the pin or ball B and its half-boxes C C', the one C' of which is constructed with a step, n, of the adjusting-key D, for the one half-box C', and the frame or head part A, constructed to form a chamber, e, having an opening in one of its sides and at its forward end, and formed with raised lips l m at such parts, whereby the base portion of said chamber is made to form a receptacle for oil to lubricate the pin or ball, substantially as specified.

CHARLES DIXON.

Witnesses:
WILLARD STURGE,
A. N. SHURTLEFF.